Dec. 1, 1936.  G. A. TINNERMAN  2,062,685
FASTENING DEVICE
Filed May 8, 1936
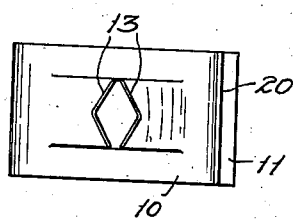
Fig. 1
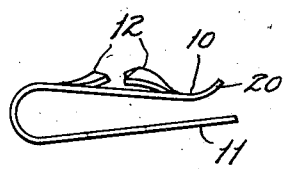
Fig. 2
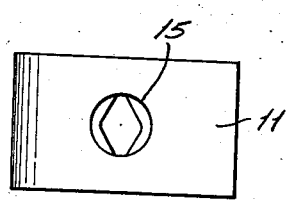
Fig. 3
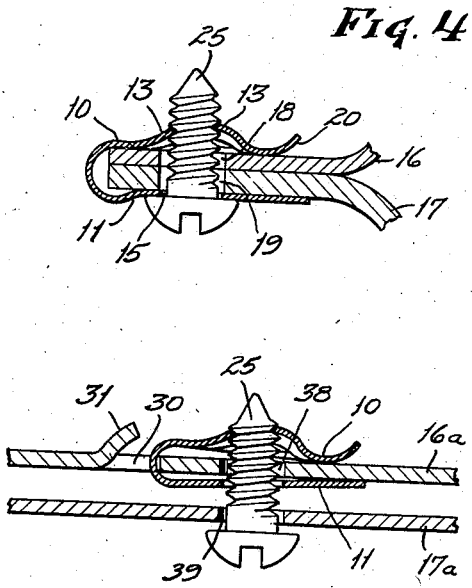
Fig. 4
Fig. 5
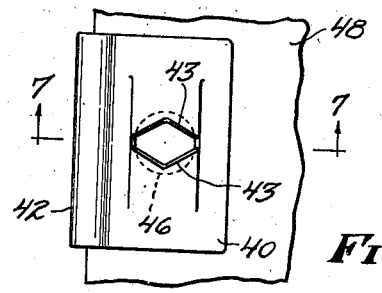
Fig. 6
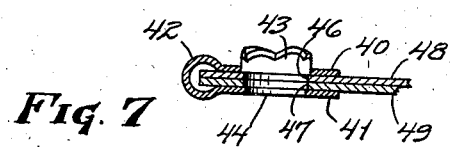
Fig. 7
INVENTOR.
BY GEORGE A. TINNERMAN
Bates, Goldrick, & Teare
ATTORNEYS Patented Dec. 1, 1936

2,062,685

UNITED STATES PATENT OFFICE 2,062,685

FASTENING DEVICE

George A. Tinnerman, Rocky River, Ohio, assignor to Albert H. Tinnerman, Cleveland, Ohio Application May 8, 1936, Serial No. 78,711

4 Claims. (Cl. 85—36)

This invention relates to fastening devices and particularly to those which have a plurality of yieldable tongues that are adapted to engage the shank of a fastening member and to bind there-against by spring tension. In using spring fasteners, in blind locations, that is, where an operator cannot readily hold a nut while he is inserting the bolt into it, it has been necessary to utilize some extraneous means, such as rivets or other fastening members, for holding the spring fasteners in place. There are many instances, however, particularly in automotive production where spring fasteners are desirable but where it is impractical to hold them in a satisfactory manner by any means heretofore employed. An example of such use is in the attachment of the fender to the body although there are many other examples which could be cited.

Referring to the drawing, Fig. 1 is a top plan view of a fastener which is made in accordance with the present invention; Fig. 2 is a side view of a fastener; Fig. 3 is a bottom view of the fastener; Fig. 4 is a section taken through the fastener when applied to the parts to be joined; Fig. 5 is a view illustrating the application of the fastener to one of the parts that are to be joined, particularly in a blind location; Fig. 6 is a top plan view of a fastener which is modified from that shown in Fig. 1 and Fig. 7 is a section taken on a plane and indicated by the line 7—7 in Fig. 6.

A spring fastener, which is indicated by Figs. 1 to 5 preferably comprises a strip of sheet metal which is bent backwardly upon itself to provide two arms one of which is indicated at 10 and the other at 11. These arms may be substantially equal in width and may be spaced apart in accordance with the thickness of the part with which the fastener is intended for use. One of the arms has a pair of tongues 12 formed integrally therewith and struck outwardly therefrom, and in the preferred arrangement, each tongue has a re-entrant recess 13, the two recesses cooperating to provide an opening for receiving the shank of the fastening member. In addition, that portion of each tongue adjacent the recess is inclined laterally to conform to the pitch of the thread of a bolt with which it is intended for use.

The arm opposite that from which the tongues are struck has an opening 15 which is larger in diameter than the outside diameter of the shank of the fastening member, the intention being to provide clearance between the fastening member and the wall of the opening 15 and to utilize solely the tongues for fastening purposes. In the illustration of Fig. 4 the parts to be joined are indicated at 16 and 17 as having openings 18 and 19 respectively which are in registration.

The spring fastener likewise has the opening 15 and the openings between the tongues 13 in registration with the openings 18 and 19. In addition the space between the arms 10 and 11 is such that the fastener may be slid over the parts which previously have been placed together with the openings 18 and 19 in registration. To facilitate the entrance of the parts into the fastener, one of the arms is flared outwardly as indicated at 20. As soon as the fastener is positioned in the proper place then the bolt 25 is moved in an endwise direction through all of the openings and is locked into place by giving it a few turns.

To use the fastener in blind locations other than at the edge of a sheet, I prefer to form a slot in one of the parts near the opening through which the bolt is adapted to pass. This is illustrated in Fig. 5 at 30, as being formed by striking part of the metal upwardly as at 31. The slot is sufficiently close to the opening 38 in the part 16a that when the fastener is moved endwise through the slot and onto the part, the tongues are in position to engage the bolt that is passed through the openings 38 and 39 in the parts 16a and 17a respectively. In this form of connection the arm 10 of the fastener engages one side of one of the parts while the arm 11 engages the opposite side. The part 17a then has its inner surface engaging the outer surface of the arm 11, so that part of the fastener is thus interposed between the two parts to be joined together. If desired the slot may be made in each of the parts to be joined so as to enable the arms of the fastener to embrace the outer surface of each part.

In Figs. 6 and 7 I have shown a modification in which the fastener comprises two substantially parallel portions or arms 40 and 41 that are connected by a looped portion 42. The arm 40 has tongues 43 projecting upwardly and in opposing relation, while the arm 41 has an opening 44 in alignment with the bolt receiving openings that are formed by the tongues, and also in alignment with the openings 46 and 47 in the parts 48 and 49 respectively. In this modification, the tongues extend in the same direction as the line of bend, whereas in Fig. 1 the tongues extend transversely of the line of bend between the arms. This latter arrangement is satisfactory in those locations where space limitations prevent the use of a spring fastener which has arms of such length as are necessary to provide the tongue formation illustration in Fig. 1.

A fastener having arms of substantially equal length assures a flat bearing surface against the part to be joined, while the curved portion that provides a connection which prevents the fastener from turning with reference to the parts to be joined during the bolt inserting operation. Moreover, the fastener is advantageous in that it is admirably suited for making connections in blind locations.

I claim:

1. A fastener comprising a one piece sheet metal strip having two arms disposed in superimposed relationship and extending in the same general direction, one of the arms having an aperture for receiving a threaded member that operates to prevent rotation of the fastener, and the other having a thread engaging portion that is formed from the arm and extends out of the plane thereof.

2. A fastener for use with threaded members comprising a one piece U-shaped sheet metal strip having registering openings therein, there being a thread engaging portion formed in one of the arms of the strip, said portion being movable with reference to the arm.

3. A fastener comprising a substantially flat one piece sheet metal strip that is bent backwardly upon itself to form two arms, one of the arms having an aperture therein to receive a threaded member and to cooperate with that portion of the strip which connects the arms to prevent rotation of the fastener, and the other arm having a thread engaging portion therein that is bent out of the plane thereof.

4. A fastener for use with threaded members comprising a sheet metal strip having two arms, one of the arms being relatively flat throughout its length and the other having a flared portion adjacent the end thereof, one of the arms having an integral yieldable thread engaging portion that is bent out of the plane thereof, and the other arm having an aperture that is adapted to receive the shank of a threaded member in non-threaded relationship so as to prevent rotation of the fastener while it is being attached to the member.

GEORGE A. TINNERMAN.